United States Patent [19]

Rube et al.

[11] 4,140,915
[45] Feb. 20, 1979

[54] APPARATUS AND METHOD FOR SENSING THE PERFORATIONS IN A PERFORATED STRIP

[75] Inventors: Helmut Rube, Grunbach; Gerhard Börner, Waldenburg, both of Fed. Rep. of Germany

[73] Assignee: Robert Bosch GmbH, Stuttgart, Fed. Rep. of Germany

[21] Appl. No.: 787,960

[22] Filed: Apr. 15, 1977

[30] Foreign Application Priority Data

Apr. 27, 1976 [DE] Fed. Rep. of Germany ....... 2618363

[51] Int. Cl.[2] .............................................. G06K 7/10
[52] U.S. Cl. .................................. 250/570; 353/26 A
[58] Field of Search ............ 250/231 SE, 237 G, 570; 356/169; 352/129; 353/26 A

[56] References Cited

U.S. PATENT DOCUMENTS

| 3,449,588 | 6/1969 | Foskett | 250/231 SE |
| 3,891,321 | 6/1975 | Hock | 356/169 X |
| 3,950,652 | 4/1976 | Yamashita | 250/570 |
| 3,999,846 | 12/1976 | Sone et al. | 250/570 X |

*Primary Examiner*—Lawrence J. Dahl
*Attorney, Agent, or Firm*—Michael J. Striker

[57] ABSTRACT

The perforated strip is transported lengthwise along a predetermined transport path. The perforations have a width w and an inter-perforation spacing s as measured in the transport direction. The perforations are sensed at two predetermined sensing locations located along the transport path. The distance between the two sensing locations is equal to as ± bw, wherein a is equal to zero, unity or an integer greater than unity, and wherein b is a number greater than zero and less than unity. Sensing the perforations at sensing locations thusly spaced makes it possible to determine from the resultant signals the direction of strip transport.

13 Claims, 9 Drawing Figures

APPARATUS AND METHOD FOR SENSING THE PERFORATIONS IN A PERFORATED STRIP

BACKGROUND OF THE INVENTION

The invention relates to an apparatus and method of sensing the perforations in a perforated strip, in order to generate pulses used for various control functions, such as controlled transport by predetermined distances, automatic regulation of strip transport speed, and many others.

Known perforation sensing arrangements are not readily capable, if at all, of distinguishing between forward and backward transport of a perforated strip, i.e., merely from the sensing pulses generated in response to detection of a perforation in a transported strip.

Prior-art arrangements capable of differentiating between forward and backward strip transport incorporate, for example, a moving signal generator driven by the strip transport means and two photoelectric transducers arranged one after the other in the strip transport direction in the region of a sensing beam. The transducers supply pulses offset from each other with respect to time and partly overlapping. Depending upon which of the transducers first receives light, an evaluating circuit generates one or the other of two different pulses, utilized for example to effect forward or backward counting on a counter.

Despite the considerable expense involved for the moving signal generator, sensing arrangements of this type are not very satisfactory. The strip transport means which also drives the moving signal generator will often be running idle — i.e., when a strip is not being transported. As a result, even when the strip transport means is running idle, the signal generator continues to generate pulses. Special means are required to prevent generation of this misinformation or to discriminate between this misinformation and proper information, for example means operative for automatically turning the signal generator off when the strip transport means ceases to transport a strip and begins to run idle, and for then automatically turning the signal generator back on when the strip transport means resumes strip transport. Additionally, with this known type of sensing arrangement, no means are provided for taking into account discrepancies between the speed of operation of the strip transport means and the true strip transport speed. The resultant misinformation cannot be corrected or compensated for.

SUMMARY OF THE INVENTION

It is a general object of the invention to provide a sensing arrangement of the general type in question which is novel in itself and furthermore capable of being used for discriminating between forward and backward strip transport, and which additionally avoids the advantages of the prior art relating to expense and reliability of operation.

According to one concept of the invention, this can be achieved by sensing the perforations in the perforated strip at two predetermined sensing locations spaced along the strip transport path. The two predetermined sensing locations are spaced from each other a distance equal to as ± bw, where s is the inter-perforation spacing and w the perforation width both measured in the strip transport direction, a is zero, unity or an integer greater than unity, and b is a number greater than zero and less than unity.

The sensing arrangement can incorporate optoelectronic sensors. In that event, it is advantageous that the optoelectronic sensor be so designed that it produces two separate sensing beams incident upon the transported strip at different respective ones of the two sensing locations, with two photoelectric transducers being provided, each one receiving a respective one of the two sensing beams from a respective one of the two sensing locations.

A less expensive alternative involves the use of an optoelectronic sensor so designed that it produces two sensing beams having different respective characteristics, each beam incident upon the strip at a different respective one of the two sensing locations, with a single photoelectric transducer receiving both sensing beams from both sensing locations. The two sensing beams are advantageously produced from the light of a single light source using suitable optical means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
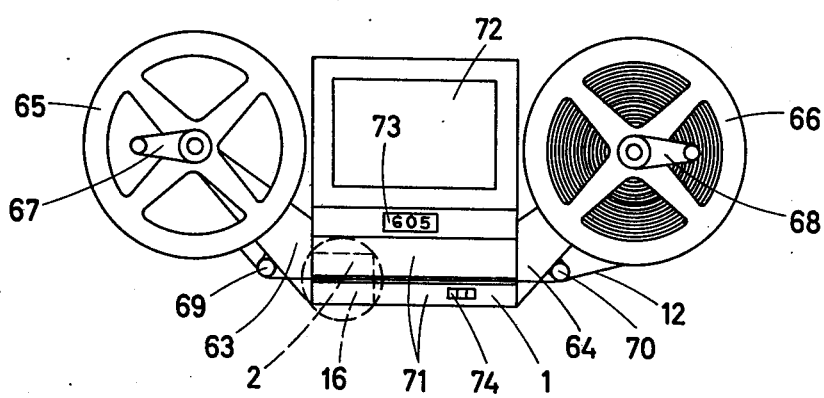
FIG. 1 depicts a film viewer provided with the inventive sensing arrangement.
Figure 2:
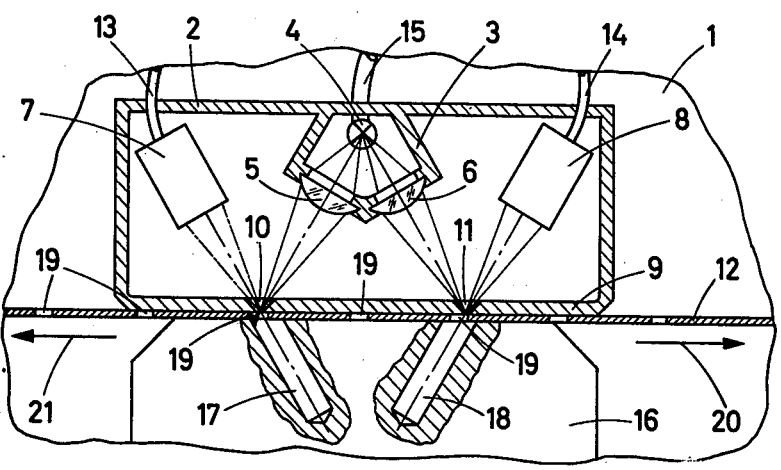
FIG. 2 depicts on a larger scale and in section a first embodiment of a sensing arrangement used in the viewer of FIG. 1.

The film viewer of FIG. 1 has a housing 1 in which is incorporated the sensing arrangement shown in FIG. 2. The sensing arrangement housing 2 incorporates a small housing 3 for a light source 4. Lenses 5, 6 are provided in two openings in this small housing 3. The housing 2 of the sensing arrangement additionally accommodates two photoelectric transducers 7, 8. The photosensitive surfaces of these photoelectric transducers 7, 8 and also the lenses 5, 6 all face toward the same wall 9 of the housing 2 of the sensing arrangement. Housing wall 9 is provided with two funnel-shaped openings 10, 11. The lens 5 and the photosensitive surface of the photoelectric transducer 7 are oriented towards the opening 10; the lens 6 and the photosensitive surface of the photoelectric transducer 8 are oriented towards the opening 11.

The lenses 5, 6 project the light source 4 into focus on the plane of the outer surface of the housing wall 9. This outer surface of housing wall 9 serves as a guide surface for a perforated strip 12. Numerals 13 and 14 denote electrical leads connected to the photoelectric transducers 7, 8. Electrical lead 15 serves to energize light source 4. A guide structure 16 located opposite to guide surface of housing wall 9 completes the strip guide means. Guide structure 16 is provided with two bores 17, 18 oriented away from respective ones of the two photoelectric transducers 7 and 8. The interior surfaces of the bores 17, 18 are matte black.

The strip 12 is transported between the sensing arrangement housing 2 and the guide structure 16 in such a way that the perforations 19 in the strip 12 travel over the openings 10, 11 and the bores 17, 18. The bores 17, 18 are spaced apart a distance equal to twice the interperforation spacing plus a distance less than the perforation width as measured in the transport direction. Arrow 20 indicates the direction of forward transport of strip 12, arrow 21 the direction of backward transport.

In the embodiment of FIG. 2, the light beam focussed by lens 6 onto the upper surface of strip 12 is reflected therefrom towards and into incidence upon the photosensitive surface of photoelectric transducer 8. The light beam focussed by lens 5 passes through the funnel-shaped opening 10 and through the perforation 19 located thereat into the bore 17, where it is absorbed by the matte black interior surface of the bore 17. The photosensitive surface of the photoelectric transducer 7 receives no light; this is indicated in FIG. 2 by the dash-dot lines leading from the sensing location at 10 towards the photosensitive surface of transducer 7.

Figure 3:
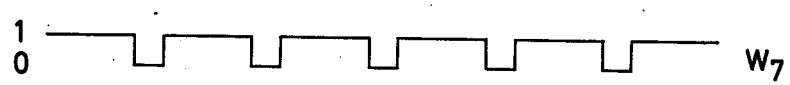
FIG. 3 depicts the pulse trains generated when the film is transported forward.
Figure 3:

If the strip 12 is transported forward out of the position shown in FIG. 2, the first thing that occurs is that the photosensitive surface of photoelectric transducer 8, too, no longer receives light. As soon as the perforation 19 at the sensing location is moved past the opening 10, the sensing beam passing through lens 5 is reflected off the strip 12 onto the photosensitive surface of photoelectric transducer 7. Shortly thereafter, the photosensitive surface of transducer 8, too, again receives the light beam passing through lens 6. So long as the strip 12 continues to be transported forward, this sequence of events is repeated, as indicated in FIG. 3. As illustrated in FIG. 3, the positive pulses generated by transducer 7 lead the positive pulses generated by transducer 8, during forward strip transport.

Figure 4:
FIG. 4 depicts the pulse trains generated when the film is transported backward.
Figure 4:
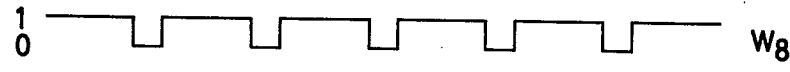

If the strip 12 is now transported backward, the pulses generated by transducer 8 lead the pulses generated by transducer 7, as indicated in FIG. 4.

Figure 5:
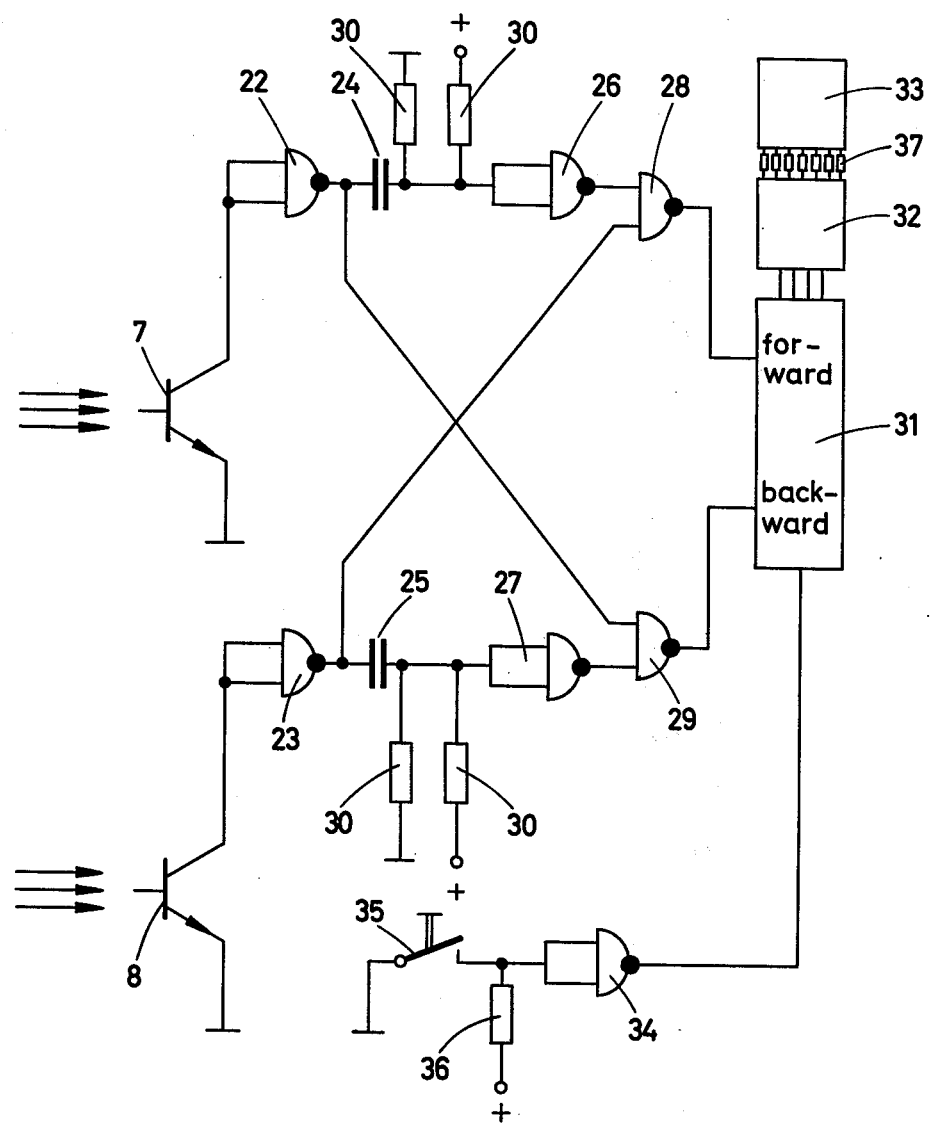
FIG. 5 depicts an evaluating circuit which can determine from the pulse trains of FIGS. 3 and 4 whether the film is being transported forward or backward.

FIG. 5 depicts an evaluating circuit which can determine from the two sets of pulse trains shown in FIGS. 3 and 4 whether the strip is being transported forward or backward.

The photoelectric transducers 7, 8 are shown in FIG. 5 to be phototransistors. The collector circuits of these phototransistors are identical. Schmitt triggers 22, 23 serve as threshold circuit stages for the transducers 7, 8. Connected to the outputs of the Schmitt triggers 22, 23 are respective capacitors 24, 25, inverters 26, 27 and NAND-gates 28, 29. One of the inputs of NAND-gate 28 is connected to the output of Schmitt trigger 23, whereas one of the inputs of NAND-gate 29 is connected to the output of Schmitt trigger 22. Numeral 30 denotes protective resistors connected to the junctions between capacitors 24 and 25 and inverters 26 and 27. The outputs of the inverters 26, 27 are connected to respective inputs of the NAND-gates 28, 29. The outputs of the two NAND-gates are connected to respective inputs of a forward-backward counter 31. Connected to the output of the forward-backward counter 31 is a decoder 32, and to the output of the latter a digital display 33 of the seven-segment-digit type. Closing of a pushbutton switch 35, through the intermediary of an electronic switch 34, causes the count on the counter 31 and likewise the display on display 33 to be erased. Numeral 36 denotes a protective resistor for the electronic switch 34.

During forward transport of the strip 12, the photoelectric transducer 7 is each time activated in advance of the photoelectric transducer 8; during backward transport of the strip 12, the photoelectric transducer 8 is each time activated in advance of the photoelectric transducer 7. The pulses from the transducers 7, 8 are differentiated by their respective capacitors 24, 25. During forward transport, each pulse generated by photoelectric transducer 8 is transmitted via Schmitt trigger 23 to the input of NAND-gate 28, thereby enabling NAND-gate 28 for signal transmission. Accordingly, the negative pulse derived from photoelectric transducer 7 and transmitted via Schmitt trigger 22, differentiated by capacitor 24, inverted by inverter 26 and transmitted by NAND-gate 28 reaches the forward-backward counter 31 as a forward-count pulse. Meanwhile, the NAND-gate 29 is kept disabled by means of the pulse generated by photoelectric transducer 7.

During backward transport of the strip 12, the pulse generated by photoelectric transducer 7 enables the NAND-gate 29 so that, in a manner analogous to what has just been described for forward strip transport, the pulse derived from photoelectric transducer 8 is applied from the output of NAND-gate 29 as a backward-count pulse to the counter 31. In this situation, the NAND-gate 28 is kept disabled.

The forward-backward counter 31 counts in BCD code and controls the decoder 32. The decoder 32 at its outputs, via current-limiting resistors 37, controls the seven-segment-digit display 33.

As already mentioned, the display can be erased by pressing pushbutton switch 35.

Figure 6:
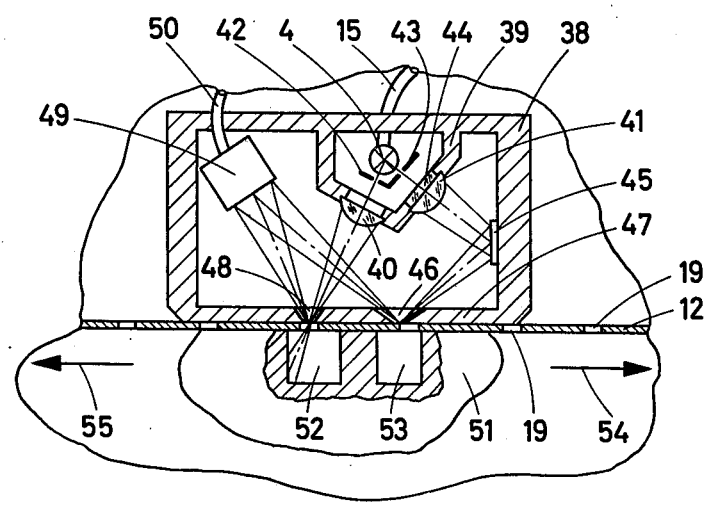
FIG. 6 is a view similar to FIG. 2, showing a second embodiment of the inventive sensing arrangement.
Figure 7:
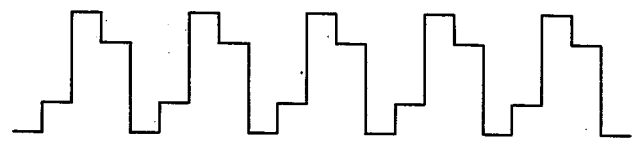
FIGS. 7 and 8 depict the pulse trains generated upon forward and backward film transport when the sensing arrangement of FIG. 6 is employed.
Figure 8:
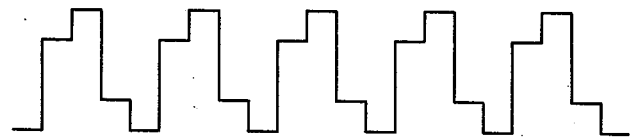

The embodiment depicted in FIGS. 6-8 includes a sensing arrangement housing 38 which accommodates a small housing 39 containing a light source 4. Lenses 40, 41 are arranged in two openings in the small housing 39. Located between the light source 4 and respective ones of the two lenses are diaphragms 42, 43. The opening accommodating lens 41 additionally accommodates a filter 44. The focussed light beam passing through lens 41 is incident upon a mirror 45 secured to the inner wall of the sensing arrangement housing 38. From there it is reflected to a funnel-shaped opening 46 in a wall 47 of the housing 38. The focal length of lens 41 and its distance from the diaphragm 43 are so selected that the image of the aperture in diaphragm 43 is focussed into the plane of the outer (lower) surface of wall 47. The light beam passing through lens 40 and focussed by the latter is oriented toward a funnel-shaped opening 48 in the wall 47. The lens 40 focusses an image of the aperture in diaphragm 42 onto the aforementioned plane, in which the outer surface of wall 47 is located. The sensing arrangement housing 38 additionally accommodates a photoelectric transducer 49. The photosensitive surface of the latter is so oriented that when the sensing beams are reflected onto it from the plane in which the images of the apertures of diaphragms 42, 43 are focussed, these reflected beams are incident upon the photosensitive surface of 49 at approximately equal angles (+x°, −x°). In this way, the two sensing light beams both impinge upon the same surface area of the photosensitive surface of 49. Numeral 50 denotes the electrical lead connected to the photoelectric transducer 49. Electrical energy is supplied to light source 4, as in FIG. 2, by means of the electrical lead 15. As in FIG. 2, the strip 12 with its perforations 19 is transported past the outer surface of wall 47. The guide means for strip 12 is completed by a guide structure 51 provided with cavities 52, 53 having matte black interior surfaces. Arrow 54 indicates the direction of forward strip transport, arrow 55 backward strip transport.

In the embodiment of FIG. 6, the light beam passing through filter 44 and lens 41, reflected off mirror 45, and reflected off the upper surface of strip 12 towards the photoelectric transducer 49 reaches the latter markedly attenuated, in comparison to the light beam passing through lens 40 and likewise reflected off the strip 12 onto the photoelectric transducer 49.

The spacing between the funnel-shaped openings 46, 48 corresponds to the inter-perforation spacing, minus a distance smaller than the perforation width as measured in the transport direction. Accordingly, during forward transport of strip 12, it is always first the attenuated light beam and only thereafter the higher-intensity light beam which is incident upon the photosensitive surface of photoelectric transducer 49. As a result, during forward transport of strip 12, a pulse train is generated such as shown in FIG. 7. During backward transport of strip 12, the pulse train generated is as shown in FIG. 8.

The two pulse trains shown in FIGS. 7 and 8 can be distinguished from each other by electronic circuitry, for example by means of a so-called window discriminator, so as to make possible differentiation between forward transport and backward transport, and thereby make possible the implementation of an operation dependent upon such differentiation, such as forward-backward counting.

Figure 9:
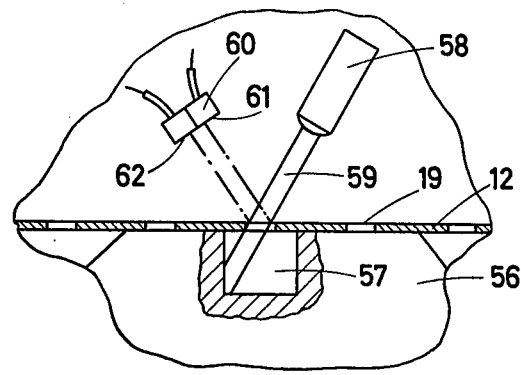
FIG. 9 is a view similar to FIG. 2, showing a third embodiment of the inventive sensing arrangement.

The embodiment shown in FIG. 9 includes a strip guide structure 56 provided with a bore 57 whose interior surface is matte black. The strip 12 is transported along the upper surface of guide structure 56, with its perforations 19 passing over the bore 57. A light source 58 directs a parallel light beam 59 at an angle onto the strip 12. The sensing location, i.e., the location at which the light beam 59 can be incident upon an inter-perforation zone of the strip 12, is as in the other embodiments located above an internally matte black bore, here the aforementioned bore 57. The breadth of the parallel-ray light beam 59 is kept smaller than the transport-direction width of the perforations 19. In FIG. 9, this parallel-ray light beam 59 passes through a perforation 19 and is absorbed by the matte black interior surface of bore 57. When the light beam 59 is incident upon an inter-perforation zone of the strip 12, it is reflected therefrom onto a pair of transducers 60 (as indicated in dash-dot lines). The respective, discrete photosensitive surfaces 61, 62 of the transducer pair 60 receive equal cross-sectional components of the reflected parallel-ray beam 59, when the beam 59 is being reflected in its entirety by the strip 12. During transport of strip 12, the pulse trains which are generated correspond in principle to those depicted in FIGS. 3 and 4. Accordingly, here likewise, use can be made of the circuit shown in FIG. 5 (and discussed with respect to the embodiment of FIG. 2), for distinguishing between forward and backward transport of strip 12.

In the embodiments discussed above, the width (w) of the perforations is measured in the strip transport direction. The inter-perforation spacing (s) is the distance, measured in the transport direction, between corresponding points of adjoining perforations (for example, the leading end of one perforation and the leading end of the subsequent perforation). The distance between the two sensing locations (the locations at which the two light beams are incident upon the plane of the transported strip) is in general equal to as ± bw, where a is zero, unity or an integer greater than unity, and where b is a number greater than zero and less than unity. In the embodiment of FIG. 2, the distance between the two sensing locations is equal to 2s + bw, i.e., to twice the inter-perforation spacing plus a distance smaller than the perforation width w. In the embodiment of FIG. 6, the distance between the two sensing locations is equal to s − bw, i.e., to the inter-perforation spacing minus a distance smaller than the perforation width w (a = 1). In the embodiment of FIG. 9, the parallel-ray beam 59 is to be considered as composed of two component beams of identical cross-sectional area directly adjoining each other. Accordingly, the two sensing locations (the locations where these component beams are incident upon the plane of the upper surface of the strip) likewise adjoin each other directly. The distance (measured in the transport direction) between these two directly adjoining sensing locations is the spacing between corresponding points of these two sensing locations, for example the spacing between their centers. Thus, it will be appreciated that here, too, the distance between the two sensing locations is equal to as ± bw, and more specifically equal to bw, inasmuch as here a = 0.

The film viewer 1 shown in FIG. 1 is provided with reel arms 63, 64 carrying film reels 65, 66. These film reels 65, 66 are driven by means of hand cranks 67, 68. The strip 12 is guided about guide rollers 69, 70. Intermediate these two guide rollers 69, 70, the strip 12 is transported through a guide housing 71 provided in conventional manner with a film-frame window and optical and mechanical means for reproducing upon a viewing screen 72 the image on the frame located at the film-frame window. The guide housing 71 accommodates the sensing arrangement housing 2. Numeral 73 denotes a digital counter, e.g., for frame number, transported strip length, or the like. A main switch 74 serves to turn on the apparatus 1, including the components in housing 2 (FIG. 2), or 38 (FIG. 6), or the components 58, 60 (FIG. 9). It will be understood that the use of the inventive sensing arrangement in a film viewer of this type is illustrative only.

It will be understood that each of the elements described above, or two or more together, may also find a useful application in other types of constructions and circuits differing from the types described above.

While the invention has been illustrated and described as embodied in an arrangement for sensing perforations in perforated film strips, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus of the type provided with means for lengthwise transporting along a predetermined path a perforated strip whose equidistantly spaced perforations have a width w as measured in the transport direction and an inter-perforation spacing s, an arrangement for sensing the perforations, the arrangement comprising sensing means operative for sensing the perforations at two predetermined sensing locations along the transport path, the distance between the two predetermined sensing locations being equal to as ± bw, wherein a is equal to zero, unity or an integer greater than unity, and wherein b is a number greater than zero and less than unity.

2. The arrangement defined in claim 1, the sensing means being optoelectronic sensing means.

3. The arrangement defined in claim 2, the optoelectronic sensing means comprising means producing two separate sensing beams such oriented to be incident upon the strip at a respective one of the two predetermined sensing locations and two separate photoelectric transducers each positioned to receive a respective one of the sensing beams from a respective one of the two sensing locations.

4. The arrangement defined in claim 2, the optoelectronic sensing means comprising means producing two sensing beams of different respective characteristics each oriented to be incident upon the strip at a respective one of the two predetermined sensing locations and a single photoelectric transducer, the orientation of the two sensing beams and the position and orientation of the single photoelectric transducer being such that the single photoelectric transducer receives both beams from both sensing locations.

5. The arrangement defined in claim 2, the optoelectronic sensing means comprising a single light source, means producing from the light of the single light source two separate sensing beams each oriented to be incident upon the strip at a respective one of the two predetermined sensing locations and a single photoelectric transducer, the orientation of the two sensing beams and the position and orientation of the single photoelectric transducer being such that the single photoelectric transducer receives both beams from both sensing locations.

6. The arrangement defined in claim 4, the different respective characteristics of the two sensing beams being such that one beam when received by the single photoelectric transducer has one intensity and the other beam a different intensity, but both beams the same cross-sectional area.

7. The arrangement defined in claim 5, the means producing the two separate sensing beams from the light of the single light source including attenuating means for attenuating the intensity of one of the beams relative to that of the other.

8. The arrangement defined in claim 2, the optoelectronic sensing means comprising means producing two separate sensing beams each focussed upon the strip at a respective one of the two predetermined sensing locations and photoelectric transducer means operative for receiving the two sensing beams from the two sensing locations.

9. The arrangement defined in claim 2, the optoelectronic sensing means comprising means producing two parallel sensing beams each oriented to be incident upon the strip at a respective one of the two predetermined sensing locations and photoelectric transducer means positioned to receive the two sensing beams from the two sensing locations.

10. The arrangement defined in claim 9, the width of the two sensing beams where the latter are incident upon the strip being smaller than the width of a perforation on the strip.

11. A method of sensing perforations in a perforated strip being lengthwise transported along a predetermined path, the perforations being equidistantly spaced, each having a width w as measured in the transport direction and an inter-perforation spacing s, the method comprising sensing the perforations in the strip at two predetermined sensing locations along the transport path, the distance between the two predetermined sensing locations being equal to as ± bw, wherein a is equal to 0, unity or an integer greater than unity, and wherein b is a number greater than zero and less than unity.

12. In an apparatus of the type provided with means for lengthwise transporting along a predetermined transport path, in either a first or an opposite second direction along such path, a perforated strip having equidistantly spaced perforations each of width w as measured in the transport direction and an inter-perforation spacing s, an arrangement operative for producing first signals when the perforated strip is being transported along such path in the first direction and distinguishable second signals when the perforated strip is being transported along such path in the opposite second direction, the arrangement comprising perforation-sensing means being positioned to sense said perforations at two predetermined stationary sensing locations along the transport path, the distance between the two predetermined sensing locations being equal to as ± bw, wherein a is equal to zero, unity or an integer greater than unity, and wherein b is a number greater than zero and less than unity.

13. A method of determining the transport direction of a perforated strip being lengthwise transported along a predetermined path in either a first direction or a second direction opposite thereto, the perforations of the perforated strip being equidistantly spaced, the perforations each having a width w as measured in the transport direction and an inter-perforation spacing s, the method comprising generating first signals when the perforated strip is being transported along such path in the first direction and distinguishable second signals when the perforated strip is being transported along such path in the opposite second direction, this comprising using perforation-sensing means operative for generating perforation-responsive signals, arranging the perforation-sensing means to sense the perforations at two predetermined stationary sensing locations along the transport path, the distance between the two predetermined sensing locations being equal to as ± bw, wherein a is equal to zero, unity or an integer greater than unity, and wherein b is a number greater than zero and less than unity.

* * * * *